Figure 1:
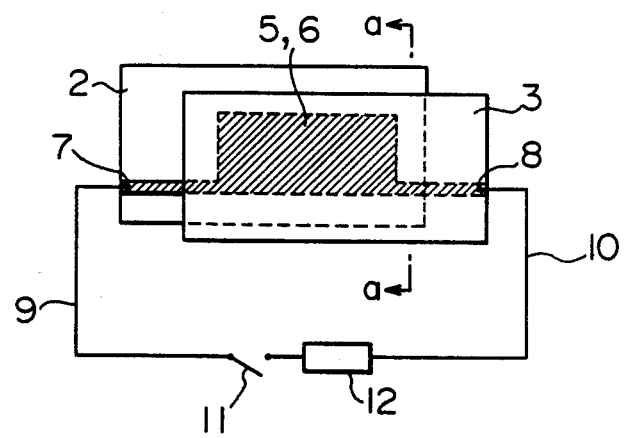

United States Patent [19]

Yamada et al.

[11] Patent Number: 4,555,355
[45] Date of Patent: Nov. 26, 1985

[54] COMPOSITION FOR LIQUID CRYSTAL COLOR DISPLAY

[75] Inventors: Yasuyuki Yamada; Tadaaki Tanaka, both of Ohmuta; Ryoichi Tukahara, Mobara; Tsutomu Nishizawa, Ohmuta, all of Japan

[73] Assignee: Mitsui Toatsu Chemicals, Inc., Tokyo, Japan

[21] Appl. No.: 552,302

[22] Filed: Nov. 22, 1983

Related U.S. Application Data

[62] Division of Ser. No. 385,400, filed as PCT JP81/00258, Sep. 30, 1981, published as WO82/01191, Apr. 15, 1982, § 102(e) date May 21, 1982, Pat. No. 4,459,218.

[30] Foreign Application Priority Data

Oct. 3, 1980 [JP] Japan ................................. 55-137779

[51] Int. Cl.$^4$ ........................... C09K 3/34; G02F 1/13
[52] U.S. Cl. .................................. 252/299.1; 350/349
[58] Field of Search ..................... 252/299.1; 350/349

[56] References Cited

U.S. PATENT DOCUMENTS

| | | | |
|---|---|---|---|
| 4,211,473 | 7/1980 | Shanks | 350/349 |
| 4,378,302 | 3/1983 | Afterguy et al. | 252/299.1 |
| 4,454,057 | 6/1984 | Kaneko et al. | 252/299.1 |
| 4,459,218 | 7/1984 | Yamada et al. | 252/299.1 |

FOREIGN PATENT DOCUMENTS

| | | | |
|---|---|---|---|
| 47027 | 3/1982 | European Pat. Off. | 252/299.1 |
| 68427 | 1/1983 | European Pat. Off. | 252/299.1 |
| 98522 | 1/1984 | European Pat. Off. | 252/299.1 |
| 2851513 | 6/1980 | Fed. Rep. of Germany | 252/299.1 |
| 3231707 | 3/1984 | Fed. Rep. of Germany | 252/299.1 |
| 54-48572 | 4/1979 | Japan | 252/299.1 |
| 54-48571 | 4/1979 | Japan | 252/299.1 |

Primary Examiner—Teddy S. Gron
Attorney, Agent, or Firm—Fisher, Christen & Sabol

[57] ABSTRACT

As dichroic dyes for use in a liquid color display device, compounds of formula (I)

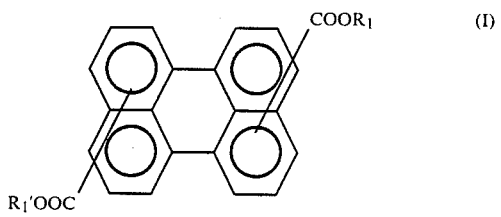

such as 4'-octylphenyl perylene-3,9-dicarboxylate are provided. These compounds have various characteristic properties. For example, (1) they have a sufficient coloring ability in small amounts; (2) they have a high dichroic ratio and show a high contrast by application and non-application of voltage; (3) they have sufficient compatibility with liquid crystals; (4) they have excellent durability, are stable, and do not reduce the performance of a display device even in long-term use.

7 Claims, 2 Drawing Figures

COMPOSITION FOR LIQUID CRYSTAL COLOR DISPLAY

This is a division of application Ser. No. 385,400, filed as PCT JP 81/00258, Sep. 30, 1981, published as WO 82/01191, Apr. 15, 1982, § 102(e) date May 21, 1982, now U.S. Pat. No. 4,459,218.

FIELD OF TECHNOLOGY

This invention relates to a composition comprising liquid crystals and a dichroic dye, which is useful for liquid crystal color display utilizing an electro-optical effect. More specifically, this invention pertains to a liquid crystal composition used in display devices which utilize the electro-optical effects of liquid crystals, said composition comprising dissolved therein at least one perylenedicarboxylic acid ester compound having a structure represented by formula (I)

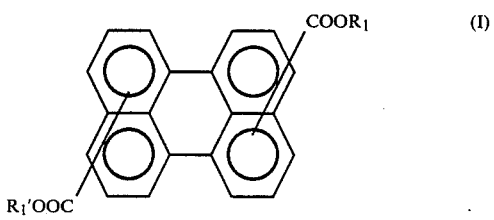

wherein $R_1$ and $R_1'$ are identical or different, and each represents a cyclohexyl, bicyclohexyl, cyclohexylphenyl, phenyl or biphenyl group which may be substituted by a halogen atom or an alkyl or alkoxy group, or a group of the formula —Alk—X in which Alk represents an alkylene group having 1 to 15 carbon atoms which may be branched, and X represents an alkoxy group having 1 to 15 carbon atoms, a nitrile group, a halogen atom, a hydroxyl group or a hydrogen atom, or a phenyl group which may be substituted by an alkyl group having 1 to 4 carbon atoms, a nitrile group, a halogen atom or a hydroxyl group, and further substituted optionally by 1 to 6 halogen atoms.

BACKGROUND TECHNOLOGY

Liquid crystalline display devices containing dichroic dyes are well known in the field of liquid crystal technology as display devices operable by a "guest-host" mode, and are utilized in watches, portable electronic calculators, televisions, etc.

The principle of these display devices lies in the fact that molecules of a dichroic dye and molecules of a liquid crystalline material are arranged such that the alignment of the dichroic dye molecules follows that of the molecules of the liquid crystalline material.

Specifically, they are based on the principle that by the application of an external stimulation which is usually an electric field, liquid crystal molecules change from an "off" state to an "on" state and are aligned, and incident to this, the dichroic dye molecules are simultaneously aligned, as a result of which the degree of light absorption by the dye molecules changes to display a color.

Such an electro-optical effect means liquid crystal color display which utilizes the so-called guest-host effect. The guest-host mode presently includes, for example, a method which involves using nematic liquid crystal having positive or negative dielectric anisotropy, and a method which involves using liquid crystals of the type which undergoes phase transition from a cholesteric phase to a nematic phase upon the application of an electric field. The present invention can be applied to any of these cases.

Generally, dichroic dyes used in liquid crystal color display devices to which such a principle is applied are basically required to meet such conditions as given below. (1) They should have a sufficient coloring ability in small amounts. (2) They should have a high dichroic ratio and show a high contrast by application and non-application of a voltage. (3) They should have sufficient compatibility with liquid crystals. (4) They should have excellent durability and be stable, and should not degrade the performance of the display devices even upon long-term use.

In recent years, various dyes having an anthraquinonic skeleton have been developed. Some of these dyes meet the aforesaid requirements, and contribute to the practical application of these display devices. However, most of these dichroic dyes having an anthraquinonic skeleton, because of their structural characteristics, exclusively show a red or blue color, and useful dichroic dyes having an anthraquinoic skeleton and showing a yellow color have not been obtained. As a result, one has to use azoic dyes having poor durability as yellow dichroic dyes. This markedly limits the range of application of the aforesaid display devices, and makes it impossible to meet the needs of the users sufficiently.

The present invention has been developed with a view to providing dichroic dyes having a yellow color which meet such requirements.

DISCLOSURE OF THE INVENTION

According to this invention, compounds of formula (I) given above are provided as dichroic dyes which meet the above purpose. Several of compounds of formula (I) in which $R_1$ and $R_1'$ are alkyl groups are known as dyes for coloring fibers or resins. Of the compounds encompassed by formula (I), some of compounds represented by formula (II)

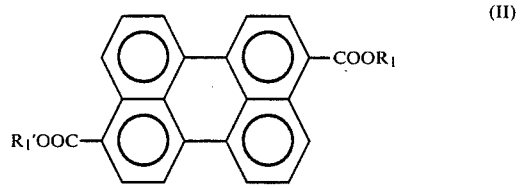

wherein $R_1$ and $R_1'$ are the same as defined above, are novel, and compounds represented by formula (III)

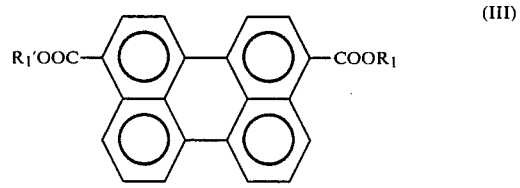

wherein $R_1$ and $R_1'$ are the same as defined above, and compounds represented by formula (IV)

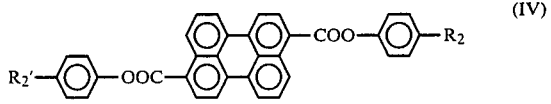

(IV)

wherein

R₂ and R₂' are identical or different, and each represents an alkyl group having 1 to 15 carbon atoms which may be branched, are quite novel. All of these compounds meet the requirements of dichroic dyes to be applied to the aforesaid liquid color display devices. Such perylene-type dyes are generally obtained advantageously by esterifying perylenedicarboxylic acids by a usual method. Other known methods which finally lead to the formation of the esters can also be used without any restriction.

Specific examples of the groups R₁ and R₁' include methyl, ethyl, propyl, isopropyl, butyl, isobutyl, sec.-butyl, t-butyl, pentyl, hexyl, heptyl, octyl, nonyl, dodecyl, pentadecyl, 2-methoxy-ethyl, 3-methoxy-propyl, 3-ethoxy-propyl, 3-butoxy-propyl, 3-pentoxy-propyl, 3-nonyloxy-propyl, 1-methoxy-1-methyl-ethyl, 1-ethoxy-1-methyl-ethyl, 1-propoxy-1-methyl-ethyl, 1-octoxy-1-methyl-ethyl, 4-methoxy-butyl, 4-ethoxy-butyl, 4-nonyloxy-butyl, 2-methoxy-1,1-dimethyl-ethyl, 2-ethoxy-1,1-dimethyl-ethyl, 2-butoxy-1,1-dimethyl-ethyl, 2-pentoxy-1,1-dimethyl-ethyl, 3-methoxy-2,2-dimethyl-propyl, 3-ethoxy-2,2-dimethyl-propyl, 3-octoxy-2,2-dimethyl-propyl, 4-methoxy-1,1,3,3-tetramethyl-butyl, 4-ethoxy-1,1,3,3-tetramethyl-butyl, 4-butoxy-1,1,3,3-tetramethyl-butyl, 4-propoxy-1,1,3,3-tetramethyl-butyl, phenyl, tolyl, cumenyl, p-t-butylphenyl, p-pentylphenyl, p-hexylphenyl, p-heptylphenyl, p-octylphenol, p-nonylphenyl, p-decylphenyl, p-dodecylphenyl, p-pentadecylphenyl, p-cyanophenyl, p-bromophenyl, p-hydroxyphenyl, p-methoxyphenyl, p-ethoxyphenyl, p-propoxyphenyl, p-butoxyphenyl, p-hexyloxyphenyl, p-heptoxyphenyl, p-octoxyphenyl, p-nonyloxyphenyl, benzyl, phenethyl, 1-methyl-1-phenylethyl, 1-methyl-1-tolylethyl, 1-methyl-1-(p-butylphenyl)-ethyl, 1-methyl-1-(p-cyanophenyl)-ethyl, 1-methyl-1-(p-hydroxyphenyl)-ethyl, 1-methyl-1-(p-chlorophenyl)-ethyl, cyclohexyl, 4-methylcyclohexyl, 4-ethylcyclohexyl, 4-butylcyclohexyl, 4-hexylcyclohexyl, 4-cyclohexylcyclohexyl, 4-heptylcyclohexyl, 4-(4'-bromocyclohexyl)-cyclohexyl, 4-(4'-methylcyclohexyl)cyclohexyl, 4-(4'-heptylcyclohexyl)cyclohexyl, 4-(4'-methoxycyclohexyl)cyclohexyl, 4-(4'-ethoxycyclohexyl)-cyclohexyl, 4-(4'-nonyloxycyclohexyl)cyclohexyl, p-cyclohexylphenyl, p-(4-methylcyclohexyl)phenyl, p-(4-heptylcyclohexyl)-phenyl, p-(4-pentyloxycyclohexyl)phenyl, p-(4-bromocyclohexyl)phenyl, biphenyl, 4'-butylbiphenyl, 4'-nonylbiphenyl, 4'-butoxybiphenyl, 4'-pentoxybiphenyl, and 4'-chlorobiphenyl.

The crude dyes produced by the aforesaid method frequently contain the unreacted materials and other impurities, and should be purified by usual methods, such as recrystallization from organic solvents, etc., or chromatography. The dyes finally obtained have an excellent property of exhibiting brilliant yellow in a liquid crystal solution. When a liquid crystal solution of the perylene-type dye in accordance with this invention is filled in a display element and left to stand for a long period of time under sunlight, an increase in current is only that which corresponds to an increase in power consumption which depends upon the liquid crystals used, and no change in color is noted. Such degree of the improvement of light fastness is exceptionally good in comparison with that attained with conventional yellow dichroic azo dyes.

POSSIBILITY OF UTILIZATION IN INDUSTRY

A yellow display element can be obtained by using the perylene-type dyes of the invention either singly or as a mixture of two or more of these. Characteristically, they are suitable for obtaining intermediate color shades by combining them with dyes of another shade, especially preferably anthraquinonic dyes having good light fastness. Specific examples of dichroic dyes to be used in combination with the dyes of the invention include blue dyes such as 1-[4'-alkyl(or alkoxy)-anilino[-4-hydroxyanthraquinones, 1,5-diamino-4,8-dihydroxy-2-(4'-alkoxyphenyl)-anthraquinones, 4,8-diamino-1,5-dihydroxy-2-(4'-alkoxyphenyl)-anthraquinones, 4,8-diamino-1,5-dihydroxy-2,6-di-(4'-alkoxyphenyl)-anthraquinones, 1,5-dialkylamino-4,8-dihydroxy-antharaquinones, 1,5-di[4'-alkyl(or alkoxy)phenyl]-4,8-dihydroxyanthraquinones, 1,5-diamino-4,8-dihydroxyanthraquinone (or the halogenation products or phenoxy-substituted products thereof), and N-alkyl(or alkylphenyl)-4,7-diamino-5,6-phthaloylisoindoline-1,3-dione; and red dyes such as 1-amino-4-hydroxyanthraquinone, 1-amino-2-alkoxy(or 4'-alkylphenoxy)-4-hydroxyanthraquinone, 1,5-di[alkyl(or alkoxy)anilino]anthraquinones, 1,5-di(4'-alkylaminoanilino)anthraquinones, and 1,4,5,8-tetrahydroxy-2-(or 2,6-di)(4'-alkoxyphenyl)anthraquinones. Other anthraquinonic dyes, and in some cases, azoic dyes as well, can be used without any restriction. It will be readily understood by those skilled in the art that intermediate shades such a green, brown or scarlet or black can be obtained by combining the above-exemplified dyes of other shades with the perylene-type yellow dyes of the invention.

The function of useful and novel dyes for liquid crystals obtained by this invention is described below with reference to the accompanying drawings.

Figure 2:
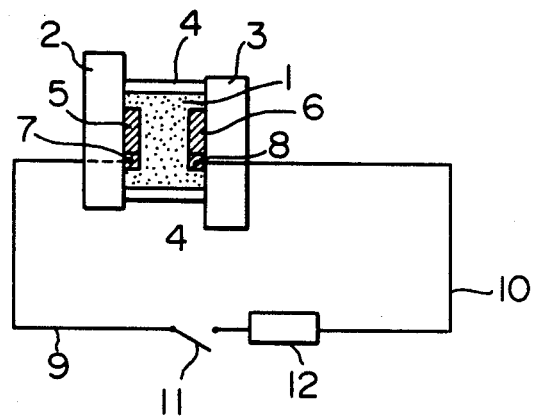

FIGS. 1 and 2 are rough views of liquid crystal display devices in which an electro-optical element in accordance with this invention is incorporated.

In the drawings, a nematic liquid crystalline substance colored with a dye is filled in a layer 1 which is interposed between two parallel glass slides 2 and 3. The slides 2 and 3 are spaced from each other by spacers 4 defining the lateral ends of the layer 1. The slides 2 and 3 have transparent electrodes 5 and 6 at their inner surfaces. The electrode 5 is connected to an external conductor wire 9 through a contact 7. Likewise, the electrode 6 is connected to an external conductor wire 10 through a contact 8. The electrodes 5 and 6 are rectangular and are arranged face-to-face with each other.

A voltage supply 12 and a switch II connected in series to the voltage supply are connected between the external conductor wires 9 and 10. The voltage supply 12 supplies a voltage of a direct current or low-frequency alternate current sufficient to position the liquid crystal molecules and dichroic dye molecules in the layer 1 in the aligned state over the inner surfaces of the slides 2 and 3. A voltage of 3 to 20 volts usually suffices.

An example of the liquid crystal used in this invention is a mixture of 43% of 4-cyano-4'-n-pentylbiphenyl, 17% of 4-cyano-4'-n-propoxybiphenyl, 13% of 4-cyano- 4'-n-pentoxybiphenyl, 17% of 4-cyano-4'-n-octoxybiphenyl, and 10% of 4-cyano-4'-n-pentyl terphenyl. There can also be used a so-called chiral nematic liquid crystal mixture which is cholesteric in the absence of voltage but changes to a nematic phase during the application of voltage by adding 5% of cholesteryl nonanoate or 3% of rotatory 4-cyano-4'-isopentyl terphenyl, etc. to the liquid crystal mixture. The liquid crystals are not limited to the above examples, and biphenyl-type liquid crystal, phenylcyclohexane-type liquid crystals, Schiff base-type liquid crystals, ester-type liquid crystals, pyrimidine-type liquid crystals, tetrazine-type liquid crystals and other liquid crystals can be used either singly or as mixtures.

The dyes in accordance with this invention may be used singly or as a mixture of two or more. The concentration of the dye may be that in which the dye dissolves in the liquid crystals. Usually, the concentration is preferably not more than 10%, preferably 0.01 to 5%, based on the liquid crystals. It is possible to mix such a dichroic dye in accordance with this invention with another dichroic dye or a non-dichroic dye to give a desired color shade, and there is no restriction in this regard.

In building such a liquid crystal display device, the device is treated in advance in order to align the liquid crystal molecules and dichroic dye molecules parallel or perpendicularly to the surface of a transparent electrode. The treatment can be effected by various methods, for example a method which comprises simply rubbing the surface of the transparent electrode in a certain direction with a cotton cloth, etc., a method which comprises coating a silane-type compound or polyamide-type compound, the method which comprises vacuum-depositing silicon oxide, and a method which comprises coating a silane compound on the surface of the transparent electrode, or vacuum-depositing silicon oxide thereon, and then rubbing it with a cotton cloth, etc. in one direction.

When a solution consisting of nematic liquid crystals having positive dielectric anisotropy and the dichroic dye of the invention is filled in a liquid crystal color display device treated so that the liquid crystal and dye molecules are aligned parallel to the surfaces of the transparent electrodes, the display device is of such a type that the yellow color of the electrode portion disappears upon the application of a voltage.

When a solution composed of nematic liquid crystals having negative dielectric anisotropy and the dichroic dye of this invention is filled in a liquid crystal color display device treated so that the liquid crystal and dye molecules are aligned perpendicularly to the surface of the transparent electrodes, this display device is of such a type that the electrode portions are colored yellow upon the application of voltage.

FIGS. 1 and 2 show display devices of the type which permits viewing of transmitted light. When a display device viewable from ahead of the glass slide 3 is built by replacing the glass slide 2 by a nontransparent reflective plate or the like or placing a reflective plate after the glass slide 2, the display device can be of the reflective type.

As stated hereinabove, there are a variety of liquid crystals and methods used in the operation of liquid color display devices including the dichroic dyes in accordance with this invention. In essence, however, these methods can be regarded as a display method based on the guest-host mode which utilizes the electro-optical effects of nematic liquid crystals, chiral nematic liquid crystals, etc.

BEST MODE OF PRACTICING THE INVENTION

The present invention is illustrated specifically by examples. The invention, however, is not limited to the descriptions in these examples.

The dichroic ratio described in the examples was measured by the following known method. Each of the dyes in accordance with this invention was dissolved in nematic liquid crystals E-8 (a product of Merck & Co.). The solution was filled in a 10 μm-thick transparent glass cell which had been treated so as to provide homogeneous alignment. The cell was placed in the light path of a spectrophotometer, and polarized light parallel to the direction of alignment of the cell was applied. The absorbance $\alpha_\parallel$ at a maximum absorption wavelength was measured. Then, polarized light perpendicular to the direction of alignment of the cell was applied, and the absorbance $\alpha_\perp$ at the same wavelength was measured. The dichroic ratio R was computed in accordance with the following equation.

$$R = \frac{\alpha_\parallel}{\alpha_\perp}$$

EXAMPLE 1

In a display device of the type shown in FIGS. 1 and 2, silicone KF-99 (a silicone compound made by Shinetsu Chemical Co., Ltd.) was coated on the inside surfaces of glass slides 2 and 3 having transparent electrodes 5 and 6 in contact with a liquid crystal layer 1, and these surfaces were treated so as to provide homogeneous alignment of liquid crystals. A colored liquid crystal solution consisting of 0.1 part by weight of 4'-octylphenyl perylene-3,9-dicarboxylate and 9.9 parts by weight of a liquid crystal mixture composed of 43% of 4-n-pentyl-4'-cyano-biphenyl, 17% of 4-n-propoxy-4'-cyanobiphenyl, 13% of 4-n-pentoxy-4'-cyanobiphenyl, 17% of 4-n-octoxy-4'-cyanobiphenyl and 10% of 4-n-pentyl-4'-cyano-terphenyl was filled in the layer 1 of the display element.

When the switch 11 was open, this display device showed a brilliant yellow color. When the switch 11 was closed and an ac voltage of 6 V at 32 Hz was applied, that part of the display device at which the transparent electrodes 5 and 6 faced each other became almost colorless. When the switch 11 was opened, a yellow color was again seen. When the display device was placed on the light path of a spectrophotometer, the maximum absorption wavelength was 480 nm. Thus, in the liquid crystals E-8, the dichroic ratio was 6.1 (478 nm).

Visible light having a wavelength of more than 400 nm was irradiated onto the display device over a period of 200 hours, no change was seen in color and the ratio of absorbance, and the color and the ratio of absorbance were quite the same as those immediately after building the display device. A change between the amount of the current which flowed between the electrodes 5 and 6 before the light irradiation and that after the light irradiation was not appreciably different from that obtained with the same device in which only the liquid crystal mixture was filled without the dye. Thus, the dye showed very good light fastness.

EXAMPLE 2

In the display device in Example 1, bicyclohexyl perylene-3,9-dicarboxylate was used instead of the 4'-octylphenyl perylene-3,9-dicarboxylate. The maximum absorption wavelength was 465 nm, and the dichroic ratio in the liquid crystals E-8 was 4.2 (465 nm).

EXAMPLE 3

In the display device in Example 1, a mixture of 40% of octyl perylene-3,9-dicarboxylate and 60% of 4,8-diamino-1,5-dihydroxy-2-(4'-nonyloxyphenyl)anthraquinone was used instead of the 4'-octylphenyl perylene-3,9-dicarboxylate. This display device was a green display device having a maximum absorption wavelength of 475 nm, 598 nm and 640 nm. As a result of the same light fastness test as in Example 1, it showed very good light fastness. The dichroic ratio in the liquid crystals F-8 was 9.9 (640 nm).

EXAMPLE 4

A colored liquid crystal mixture consisting of 0.1 part by weight of 4'-butylphenyl perylene-3,10-dicarboxylate, 9.6 parts by weight of a liquid crystal mixture (ZLI-1132, a tradename for a product of Merck & Co.) and 0.2 part by weight of optically active 4-cyano-4'-isopentylbiphenyl was filled in the layer 1 of the display device of Example 1. Thus, there was obtained a brilliant yellow display device having a maximum absorption wavelength of 481 nm. The dichroic ratio in the liquid crystals E-8 5.6 (481 nm).

EXAMPLE 5

A liquid crystal mixture consisting of 33% of 4'-pentyl-4-cyanobiphenyl, 8.5% of p-cyanophenyl 4-propylcyclohexanecarboxylate, 7% of p-cyanophenyl 4-pentylcyclohexanecarboxylate, 14% of p-ethoxyphenyl 4-butyl-cyclohexanecarboxylate, 12.5% of p-methoxyphenyl 4-pentylcyclohexanecarboxylate, 8% of p-[5-(4-ethylcyclohexyl)-2-pyrimidinyl]benzonitrile, 5% of p-[5-(4-pentylcyclohexyl)-2-pyrimidinyl]benzonitrile and 12% of p-[5-(4-heptylcyclohexyl-2-pyrimidinyl]-benzonitrile was used instead of the liquid crystal mixture in Example 1. The maximum absorption wavelength was 482 nm, and the dichroic ratio was 4.8.

EXAMPLE 6

A display device was built in the same way as in Example 1 except that a mixture consisting of 20% of sec-butyl perylene-3,9-dicarboxylate and 80% of 1-amino-2-nonyloxy-4-hydroxyanthraquinone was used instead of the 4'-octylphenyl perylene-3,9-dicarboxylate in the display device in Example 1. There was obtained a scarlet-colored display element having a maximum absorption wavelength of 480 nm 518 nm and 555 nm.

The dichroic ratio in the liquid crystals E-8 was 6.1 (555 nm).

We claim:

1. A composition for liquid crystal color display, said composition comprising at least one nematic liquid crystal and at least one perylenedicarboxylic acid ester dye represented by the following formula (II):

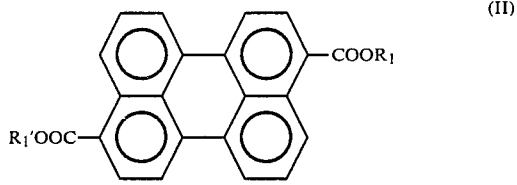

wherein $R_1'$ and $R_1$ are identical or different, and each represents a cyclohexyl, bicyclohexyl, cyclohexylphenyl, phenyl or biphenyl group which may be substituted by a halogen atom, an alkyl group having 1 to 15 carbon atoms or alkoxy group having 1 to 15 carbon atoms; or a group of the formula, Alk—X, wherein Alk represents an alkylene group having 1 to 15 carbon atoms which may be branched and X represents a phenyl group which may be substituted by an alkyl group having 1 to 4 carbon atoms, nitrile group, a halogen atom or a hydroxyl group.

2. The composition of claim 1 wherein said perylenedicarboxylic acid ester dye is represented by the following formula (IV):

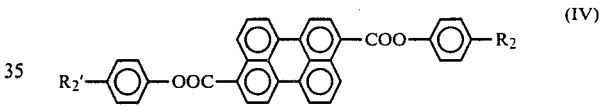

wherein $R_2'$ and $R_2$ are identical or different and each represents an alkyl group having 1 to 15 carbon atoms which may be branched.

3. The composition of claim 1 or 2 wherein a mixture of said perylenedicarboxylic acid ester dyes is dissolved in at least one nematic liquid crystal.

4. The composition of claim 1 or 2 wherein a mixture of said perylenedicarboxylic acid ester dyes is dissolved in a mixture of nematic liquid crystals.

5. The composition of claim 1 or 2 wherein the concentration of said perylenedicarboxylic acid ester dye is 0.01 to 10 percent by weight based upon the weight of the nematic liquid crystal.

6. The composition of claim 5 wherein said concentration is 0.01 to 5 percent by weight based on the weight of the nematic liquid crystal.

7. The composition of claim 1 or 2 wherein a mixture of said perylenedicarboxylic acid ester dye and at least one anthraquinoic dye is dissolved in said nematic liquid crystal.

* * * * *